(12) United States Patent
Williams et al.

(10) Patent No.: US 7,694,334 B2
(45) Date of Patent: Apr. 6, 2010

(54) APPARATUS AND METHOD FOR TRAVERSING GATEWAY DEVICE USING A PLURALITY OF BATONS

(75) Inventors: Michael G. Williams, Newbury Park, CA (US); Jon Graff, San Jose, CA (US); Charles Perkins, Saratoga, CA (US)

(73) Assignee: Nokia Corporation, Espoo (FI)

( * ) Notice: Subject to any disclaimer, the term of this patent is extended or adjusted under 35 U.S.C. 154(b) by 799 days.

(21) Appl. No.: 11/003,687

(22) Filed: Dec. 3, 2004

(65) Prior Publication Data

US 2006/0123475 A1 Jun. 8, 2006

(51) Int. Cl.
*G06F 15/16* (2006.01)
(52) U.S. Cl. .......................................... 726/13
(58) Field of Classification Search .................. None
See application file for complete search history.

(56) References Cited

U.S. PATENT DOCUMENTS

| | | | | |
|---|---|---|---|---|
| 6,092,191 A * | 7/2000 | Shimbo et al. | ............ | 713/153 |
| 6,202,081 B1 * | 3/2001 | Naudus | ............ | 709/200 |
| 6,324,648 B1 * | 11/2001 | Grantges, Jr. | ............ | 726/12 |
| 6,816,455 B2 * | 11/2004 | Goldberg et al. | ............ | 370/230 |
| 7,240,202 B1 * | 7/2007 | Orman | ............ | 713/169 |
| 2003/0115342 A1 * | 6/2003 | Lortz | ............ | 709/229 |
| 2003/0154399 A1 * | 8/2003 | Zuk et al. | ............ | 713/201 |
| 2003/0196087 A1 * | 10/2003 | Stringer et al. | ............ | 713/171 |
| 2005/0005133 A1 * | 1/2005 | Xia et al. | ............ | 713/185 |
| 2005/0081044 A1 * | 4/2005 | Giles et al. | ............ | 713/182 |

FOREIGN PATENT DOCUMENTS

JP 2002271309 A 9/2002

OTHER PUBLICATIONS

Japanese Office Action Dated Oct. 13, 2009 relating to Japan Application No. JP2005-351142, filed Dec. 5, 2005.
English Language Translation of Japanese Office Action Dated Oct. 13, 2009 relating to Japan Application No. JP2005-351142, filed Dec. 5, 2005.

* cited by examiner

*Primary Examiner*—Emmanuel L Moise
*Assistant Examiner*—David J Pearson
(74) *Attorney, Agent, or Firm*—Alston & Bird LLP

(57) ABSTRACT

A digital "baton" is provided from a firewall or other gateway, or other network device, to a device B outside the firewall, when a device A, which is inside the firewall, requests information from the device B. The device B may pass the digital baton to subsequent electronic devices that may respond to the request using the digital baton to send messages or information through the firewall to the device A. The firewall authenticates and filters the messages based on authentication of the batons contained within the messages.

37 Claims, 5 Drawing Sheets

APPARATUS AND METHOD FOR TRAVERSING GATEWAY DEVICE USING A PLURALITY OF BATONS

FIELD OF THE INVENTION

The invention relates to networking and communications. In particular, the invention relates to using code, or digital "baton," in a message that can be read by a firewall or other gateway device to authenticate the message.

BACKGROUND OF THE RELATED ART

Firewalls are network technologies that monitor and enforce rules, called policies, regarding data that passes to and from entities protected by, or "inside," the firewalls. For example, a local are network (LAN) may be protected by a firewall to filter data going to and from clients outside the domain of the LAN. Data entering the LAN domain is usually expressed as passing from the "outside," usually the Internet, through the firewall to the "inside" where the LAN's entities exist.

There are recognized problems with current firewall technology. Often legitimate data is not able to pass through a firewall due to one or more particular policies that are enforced by the firewall. For example, one problem occurs when two network devices are in a communication session. In one scenario, a device A is exchanging data in the form of messages with a device B. The device A is inside the firewall, and the device B is outside. The firewall recognizes device A as the device sending legitimate messages, and has permission under its policies to send a message to device B. However, the firewall doesn't recognize that the device B has a right to send messages from the outside through the firewall to the device A.

In a restrictive firewall, the firewall may only allow the device A to send messages out to the device B, and will only allow messages from the device B if, and only if, the device A has first sent a message to the device B, and/or only if the device B has been pre-configured in the firewall's policies to have the authority to communication with the device A or other entities inside the firewall. The device B cannot initiate a communication to the device A through the firewall because the firewall is not configured to expect or allow a message from the device B to the device A.

Another problem arises when the device B does not have the information that the device A requires, and the device B must employ other devices to obtain the information that the device A needs. The current solutions are burdensome and require the subsequent devices to retrace their communication path with the device B in order to provide the answer to the device B, which will then send the answer to the device A. Frequently, the subsequent parties don't trust the device B to convey the message to the device A. For example, if the device A requests sensitive company personnel information from the device B, the device B may have to contract a personnel server P to retrieve the information. However, device B may not be authorized to receive the personnel information from server P. In that case, the personnel server P may only be able to send the information directly to the device A as the requester. Given that the original session was between device A and device B, the firewall's policies may not allow a third device that was not a party to the original communication to send the information to the device A. To the firewall, the attempted communication from the server P to the device A may appear unsolicited, and may be disallowed by the firewall. The scenario immediately above is generally referred to as the "delegation" problem, where one device attempts to delegate a request to a third party device.

In even more complex delegations, the request from the device A may be routed through several third parties. Schematically, the scenario may appear as follows:

A->||B->C-> . . . ->R

If device R tries to send a reply directly to the device A, the restrictive firewall may block the reply because it does not have a record of the device A sending a message to the device R. This problem has special significance in scenarios where the device R is the only trusted source for the information, or when none of the intermediary devices are allowed to obtain the information due to security or privacy concerns.

One known solution is for the device R to send a message to the device B, so that the device B may send a message to the device A that the device R has the requested information. The device A may subsequently contact the device R, requesting that the device R provide the information. However, the firewall may not be configured to receive information from the device R, and it would be burdensome to require a re-configuration of the firewall every time a new third party device is found to contain the requested information.

Another known solution involves reconfiguring Internet protocol (IP) addresses using Internet protocol security (IPSec). IPSec is a set of protocols developed by the Internet engineering task force (IETF) to support secure exchange of packets at the IP layer. IPsec has been deployed widely to implement virtual private networks (VPNs). IPsec supports two encryption modes: transport and tunnel. Transport mode encrypts only the data portion (payload) of each packet, but leaves the header untouched. The more secure tunnel mode encrypts both the header and the payload. On the receiving side, an IPSec-compliant device decrypts each packet.

For IPsec to work, the sending and receiving devices must share a public key. This is accomplished through a protocol known as Internet Security Association and Key Management Protocol/Oakley (ISAKMP/Oakley), which allows the receiver to obtain a public key and authenticate the sender using digital certificates.

The IPSec solution suffers from a problem similar to that associated with using restrictive firewalls. The IPSec solution requires extensive configuration to facilitate communication between all devices participating in a communication, except that IPSec requires configuration on each device apart from just the firewall itself.

Another known solution uses host identify protocol (HIP). HIP provides a rapid exchange of device or host identities between two hosts. The exchange also establishes a pair of IPSec security associations (SA), to be used with IPsec. HIP protocol is designed to be resistant to denial-of-service (DoS) and man-in-the-middle (MitM) attacks, and provides DoS and MitM protection for upper layer protocols, such as TCP and UDP. However, as with pure IPSec protocol, HIP also requires extensive configuration with each device involved in a communication before it can be used.

Another known solution uses cryptographically generated addresses (CGAs). CGAs are IP addresses where the interface identifier is generated by computing a cryptographic one-way hash function from a public key and auxiliary parameters. The binding between the public key and the address can be verified by re-computing the hash value and by comparing the hash with the interface identifier. Messages sent from an IP address can be protected by attaching the public key and auxiliary parameters and by signing the message with the corresponding private key. CGA works without a certification authority or other security infrastructure.

However, just as is the case with IPSec and HIP protocols, CGA protocol also requires extensive configuration of each device involved in a communication before it can be used. Due to this requirement, none of these solutions, or solutions like them, solve the problem of allowing a third party device R that was previously unknown to the device A inside the firewall to provide information, originally requested from B, to the device A directly.

BRIEF SUMMARY

Briefly, and in general terms, the preferred and exemplary embodiments of the invention resolve the above and other problems by providing a digital "baton" from a firewall or gateway (called firewall herein) to a device B outside the firewall, when a device A, which is inside the firewall, requests information from the device B. The device B may pass the digital baton to subsequent recipients of the request so that they may use it when those subsequent recipients need to send a message or information through the firewall to the device A.

The digital batons are numerical indicators that confer a trusted identity on a message passing outside the firewall. The firewall creates the digital baton as an indicator or an on-going session so that when a valid digital baton is detected in a data packet, or message, received by the firewall for the device A, the firewall allows the data packet to traverse the firewall even though the firewall does not recognize the source IP address of the data packet identifying a device B (the direct recipient of the request), or a device R (a third party recipient of the request).

In accordance with another aspect of a preferred and exemplary embodiment, instead of the firewall creating the digital baton, the digital baton can be created at the application layer, for example, by a browser program. In this regard, any hardware and/or software system may be implemented within a firewall protected system or network to assign digital batons to data packets traveling outside the firewall.

In another preferred and exemplary embodiment, there is a method for providing a digital baton from a firewall to a device B outside the firewall, when a device A, which is inside the firewall, requests information from the device B. Initially, device A may establish a trust with the firewall or gateway (firewall G herein) such that the firewall G authorizes the device A to send and receive messages from inside and outside the firewall G. Further, the device A, and the device B may establish a trust between them. The device A may also authorize a trust between the device B and the firewall G. The device A, or the firewall itself, may request a digital baton to facilitate trusted communications between devices A and B. The device A may then reveal the firewall G to the device B using the digital baton. The device A and the device B may then communicate freely, through the firewall G, using the digital baton.

In another preferred and exemplary embodiment, there is a method for providing a digital baton that is provided from a firewall to a device B outside the firewall, when a device A, which is inside the firewall, requests information from the device B, but wherein the device B initiates the trust request. The device B may contact the device A first. The firewall G intercepts the data message initiating the contact. The firewall G may then establish a trust with the device A (i.e. by verifying that device A is allowed to communicate through the firewall). The firewall G may then notify the device A that a contact is attempted from the device B. The device A may establish a trust with the device B by verifying that the device B is a trusted source (which may comprise checking for whether the device B complies with the policies of the firewall G). The device A requests a digital baton from the firewall G or other security device providing digital batons. The device A may then reveal the firewall G to the device B using the digital baton (i.e., the device A notifies the device B of the digital baton in a response message to device B's request). The device A and the device B may then communicate freely, through the firewall G, using the digital baton.

In another preferred and exemplary embodiment, to allow the device A inside the firewall to establish trust with the firewall, the device A establishes a trust with the firewall by means of pre-authenticating the device A with the firewall according to the firewall's policies. Alternatively, the device A authenticates itself with the firewall as part of establishing contact with the device B. The firewall or other security device may then establish the digital baton for communication between devices A and B.

In another preferred and exemplary embodiment, a system provides a digital baton that is provided from a firewall to a device B outside the firewall, when a device A, which is inside the firewall, requests information from the device B, wherein device B transmits the digital baton to a third party device R so that device R may directly send messages using the digital baton to the device A. The devices A and B may establish a session and trust with the firewall using any of the above described methods. The firewall provides in a message from the device A, the digital baton that the returning messages should contain. The digital baton verifies that a message is part of the session and legitimate, and can be transmitted to the device A. At this point, the devices A and B may communicate freely as described above.

However, if the device B requests of a third party device R to supply information to the device A, the device B provides the digital baton to the third party device R. This may occur through a series of other third parties, wherein the device B requests the information from a device C, which requests the information from a device D, and such, until the device R is the final provider of the requested information. The digital baton is passed to each third party device so that the last device in the chain providing the information uses the digital baton to provide the information directly to the device A.

When the firewall detects a message providing information from the last third party device R in the chain, if the message is directed toward the device A, the firewall looks up the digital baton, and if the digital baton is legitimate, the firewall passes the message to the device A.

DETAILED DESCRIPTION

A preferred and exemplary embodiment, constructed in accordance with the invention, is a system and method for providing a digital "baton" from a firewall or other gateway (called firewall herein), or other network device, to a device B outside the firewall, when a device A, which is inside the firewall, requests information from the device B. The digital baton may be passed to other electronic devices to be used to provide messages that can be authenticated by the firewall or gateway device. The device B may pass the digital baton to subsequent electronic devices that may respond to the request using the digital baton to send messages or information through the firewall to the device A.

Figure 1:
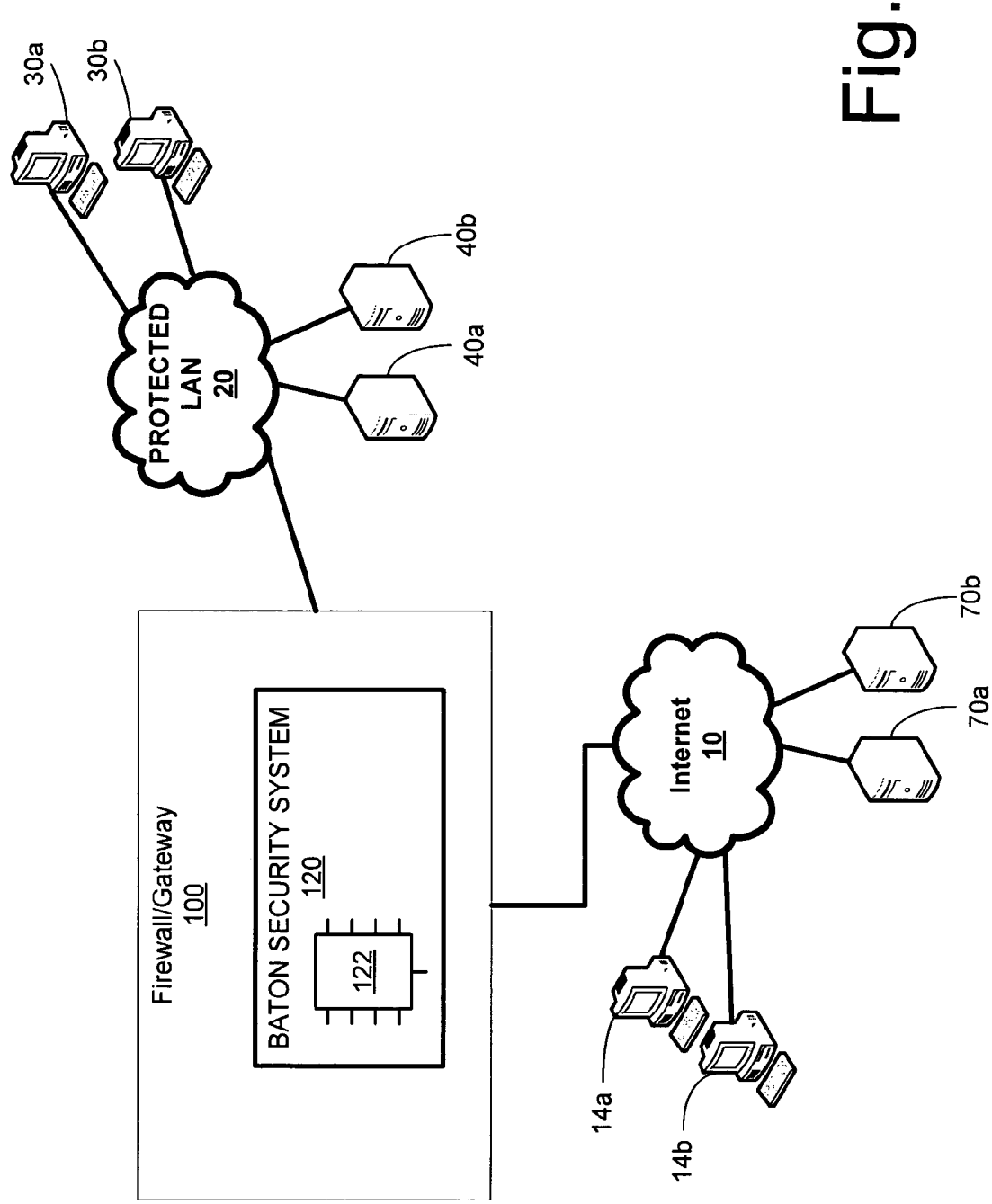
FIG. 1 is a block diagram of a firewall or gateway system according to an exemplary embodiment of a system and method for providing a digital baton from a firewall or gateway for message filtering.

With reference to FIG. 1, in a preferred and exemplary embodiment, the system includes a firewall or gateway system 100 (referred to as a firewall herein) protecting one or more electronic devices, such as servers 40a, 40b, computers 30a, 30b, or the like, from malicious attacks over a network such as the Internet 10. The one or more protected electronic devices 30a, 30b, 40a, 40b may be connected to the firewall through a local area network (LAN) 20 that is protected by the firewall 100. The malicious attacks may be perpetrated from one or more electronic devices connected to the Internet 10, which may include computers 14a, 14b, servers 70a, 70b, or the like. However, any number of the electronic devices 14a, 14b, 70a, 70b connected to the Internet 10 may have legitimate reasons to communicate with electronic devices 30a, 30b, 40a, 40b connected wired or wirelessly to the protected LAN or wireless LAN 20.

The firewall 100 contains, or is connected (wired or wirelessly) to, a digital baton security sub-system 120, which may comprise a hardware based system, or a software based system executing on a processor of the firewall 100. For example, the software based system may comprise a set of software programs stored on one or more computer readable media, the software programs being executable on one or more computers comprising the firewall 100 to support the operations of the baton security sub-system 120. Each of the software programs may comprise a set of executable code to perform at least one step or portion of the methods performed by the digital baton security sub-system 120, as described herein.

The digital baton security sub-system 120 includes storage space 122, preferable in a direct access, random access, memory, either of the firewall 100 itself, or in a separate memory chip. The storage space 122 stores a database containing records regarding open network or Internet 10 sessions for the electronic devices 30a, 30b, 40a, 40b with electronic devices connected to the Internet 14a, 14b 70a, 70b. Each record includes at least an IP (version 4 or version 6) address for the electronic device 30a, 30b, 40a, 40b with an open session, and the digital baton used for the open session. Preferably, both the of the fields containing the IP addresses and the digital batons are indexed for fast lookups in the database by the digital baton security sub-system 120.

According to one embodiment, each of the digital batons is a numerical indicator that confers a trusted identity on a message passing outside the firewall 100. The digital baton security sub-system 120 creates the digital baton as an indicator for an on-going session, for which a record is stored in the storage space 122 so that when a valid digital baton is detected in a data packet, or message, received by the firewall 100 for an electronic device (for example 30a), the firewall 100 allows the data packet to traverse the firewall 100 even though the firewall 100 does not recognize the source IP address of the data packet identifying an electronic device (for example 14a) connected to the network or Internet 10.

Thus, the firewall 100 and the trusted device 30a on the local area network 20 inside the firewall 100 create a dynamic identity, which is the digital baton.

According to one embodiment, instead of the firewall 100 creating the digital baton, the digital baton can be created at the application layer at the electronic device 30a, for example, by a browser program. In this regard, the digital baton security sub-system 120 may take the form of any hardware and/or software system within the firewall protected system or local area network 20 to assign digital batons to data packets traveling outside the firewall 100.

The digital batons may also be created on a per message/packet basis as well as a per session basis. The gateway would then track all outstanding batons as part of the session.

Figure 2:
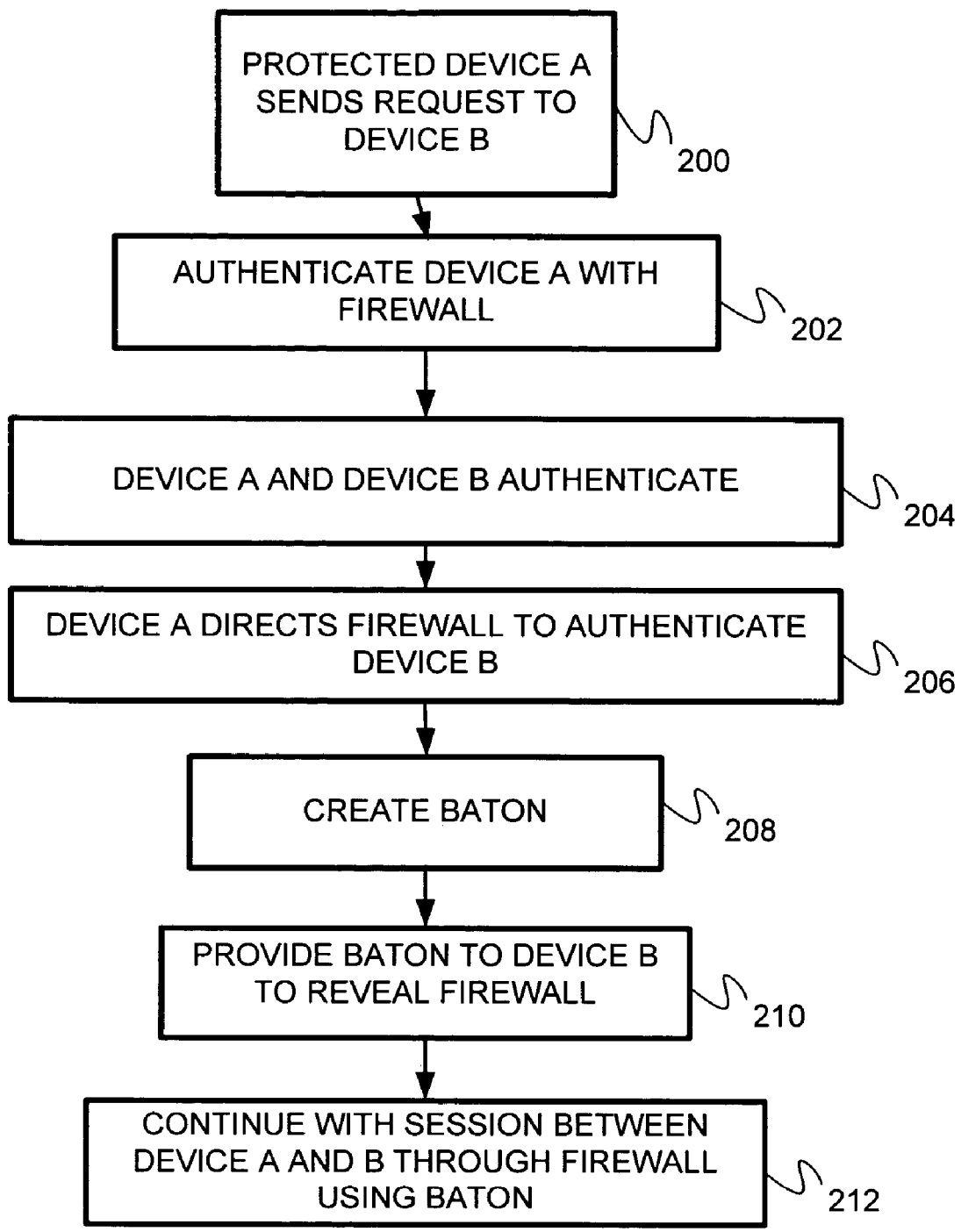
FIG. 2 is a flow diagram illustrating the steps of a method performed in one aspect of a preferred and exemplary embodiment for providing a digital baton from a firewall or digital baton security system.

With reference to FIG. 2, a data flow diagram illustrates the steps performed in one aspect of the invention, which comprises a method for providing a digital baton from a firewall 100 or digital baton security sub-system 120 to a device (for example 14a) outside the firewall 100. In step 200, a device (for example 30a), which is inside the firewall 100, may request information from the device 14a. In step 202, in some embodiments, the device 30a may need to establish a trust with the firewall 100 such that the firewall 100 may authorize the device 30a to send and receive messages to and from inside and outside the firewall 100. Further, the device 30a, and the device 14a may establish a trust between them, for example, using Digital Signature Algorithm (DSA) or Rivest-Shamir-Adleman (RSA) encryption techniques to identify the devices, step 204. The device 30a may also authorize a trust between the device 14a and the firewall 100 in the same manner, step 206.

Next, the device 30a, or the digital baton security system itself 120, may request creation of digital baton by the digital baton security sub-system 120 to facilitate further trusted communications between devices 30a and 14a, step 208. The device 30a may then reveal the firewall 100 to the device 14a using the digital baton, which the device 14a will recognize as a digital baton that must be used when transmitting data to device 30a through the firewall 100, step 210. The device 30a and device 14a may then communicate freely, through the firewall 100, using the digital baton, step 212.

Figure 3:
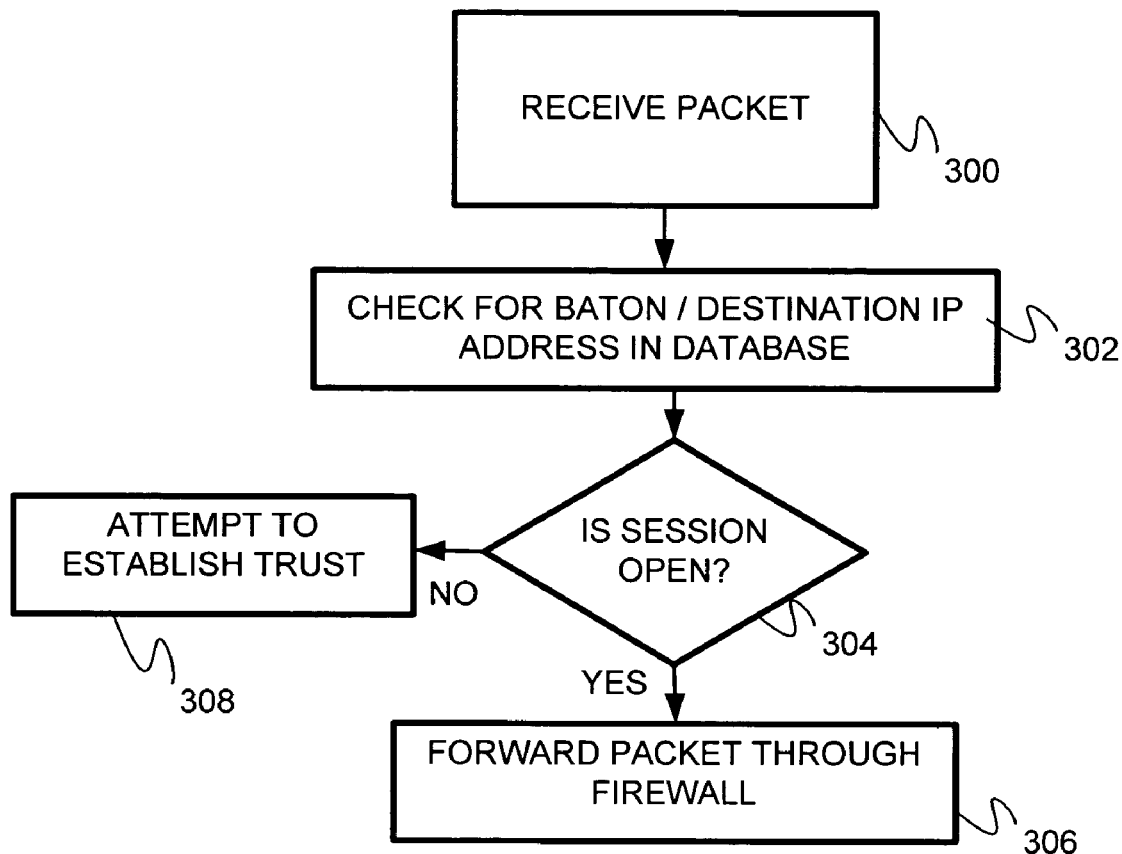
FIG. 3 is a data flow diagram illustrating a method performed by the digital baton security system to check incoming data packets.

With reference FIG. 3, a flow diagram illustrates a method performed by the digital baton security sub-system 120 to check incoming data packets. Each packet that is received from outside the firewall 100, step 300, is checked for whether there is a valid open session for the destination IP address stated in the packet with the matching digital baton number, step 302. If there is such a session open, step 304, then the packet is forwarded through the firewall to the local area network 20 for distribution to the recipient device 30a, step 306. Otherwise, an attempt is made to establish a trust between the firewall 100 and the electronic device 14a from which the data packet was received, step 308.

Figure 4:
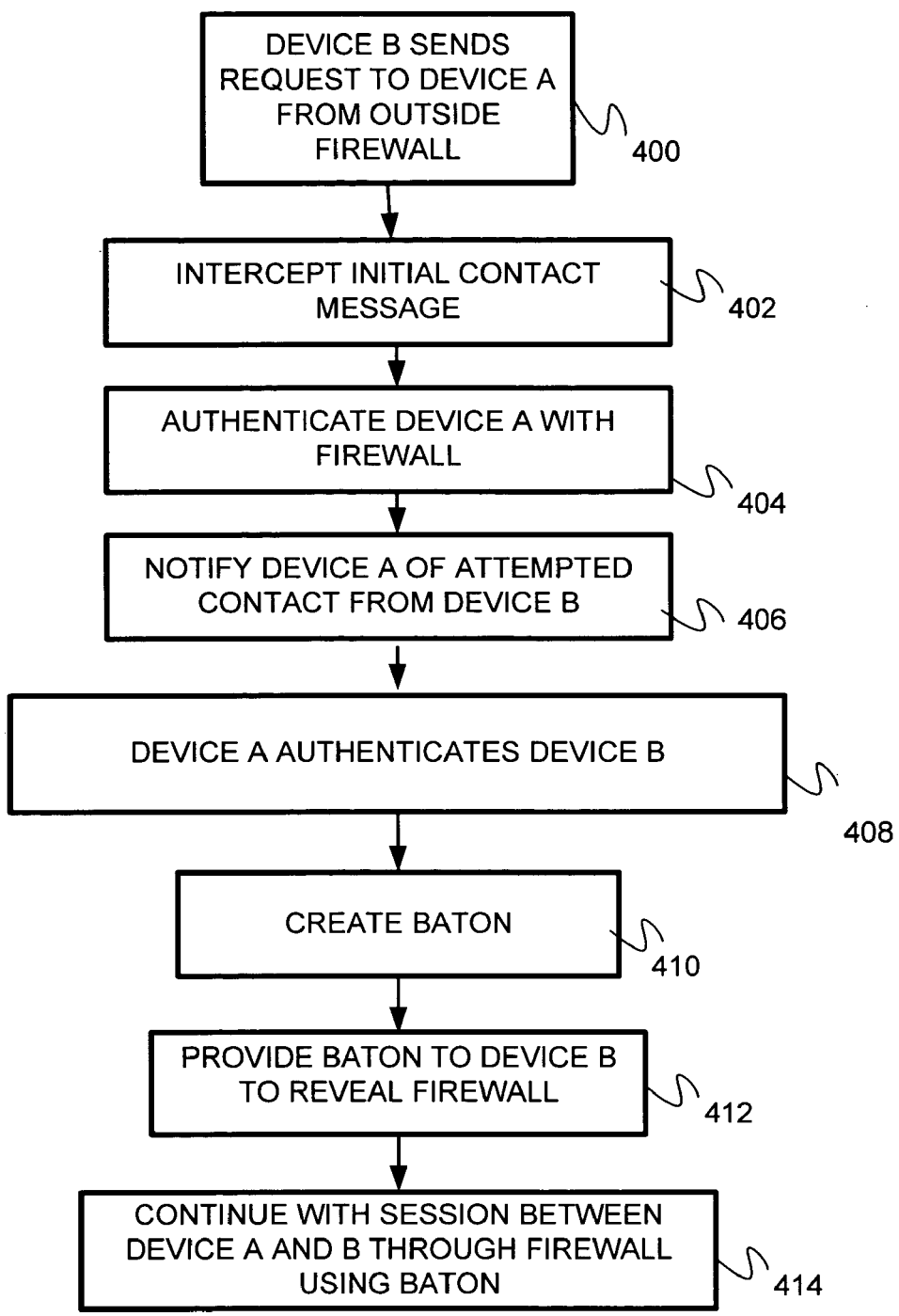
FIG. 4 is a data flow diagram illustrating another method performed in accordance with another aspect of a preferred embodiment for providing a digital baton from a firewall or digital baton security system.

With reference to FIG. 4, a data flow diagram illustrates a method performed in accordance with another aspect of a preferred embodiment, for providing a digital baton from a firewall 100 to a device 14b outside the firewall 100, when a device 30b is inside the firewall 100, but wherein the device 14b outside the firewall 100 initiates the trust request. At step 400, the device 14b may attempt to contact the device 30a first. The firewall 100 intercepts the data message for the initial contact, step 402. The firewall 100 may then establish a trust with the target device 30b (i.e. by verifying that the device 30b is allowed to communicate through the firewall 100 according to the firewall's policies), step 404. The firewall 100 may then notify the device 30b that a contact is attempted from the device 14b, step 406.

The device 30b may establish a trust with the device 14b by verifying that the device 14b is a trusted source (e.g., by using DSA or RSA encryption), step 408. The target device 30b will then request a digital baton from the firewall 100 or from the location of the digital baton security sub-sub-system 120 if it is not located at the firewall 100, step 410. The device 30b may then reveal the firewall 100 to the device 14b by using the digital baton (i.e. the device 30b notifies device 14b of the digital baton to use for communicating through the firewall), step 412. The device 30b and the device 14b may then communicate freely, through the firewall 100, using the digital baton.

In accordance with another aspect of a preferred embodiment, for the a device 30a, 30b, 40a, 40b inside the firewall 100 to establish a trust with the firewall 100, the device 30a, 30b, 40a, 40b establishes a trust with the firewall 100 by means of pre-authenticating the device 30a, 30b, 40a, 40b with the firewall 100 according to the firewall's policies. Alternatively, the devices 30a, 30b, 40a, 40b are authenticated with the firewall 100 as part of establishing contact with one or more of the devices 14a, 14b, 70a, 70b outside the firewall 100. The firewall 100 or digital baton security sub-system 120 may then establish the digital baton for communication between devices inside and outside the firewall 100.

Figure 5:
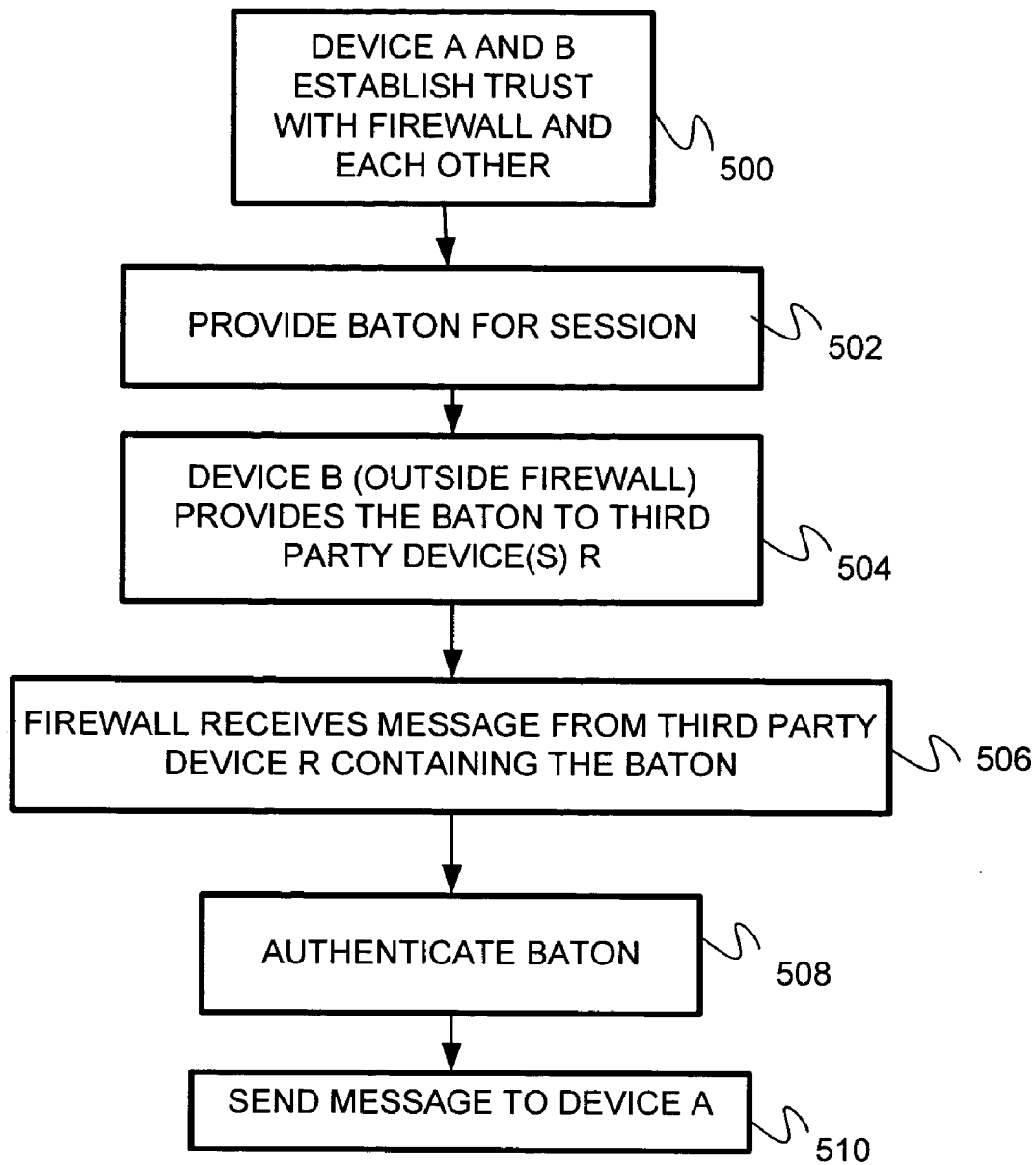
FIG. 5 is a data flow diagram illustrating yet another method performed in accordance with another aspect of a preferred embodiment for providing a digital baton from a firewall or digital baton security system.

With reference to FIG. 5, a data flow diagram illustrates a method performed in accordance with another aspect of a preferred embodiment for providing a digital baton from a firewall 100 to a device 14a outside the firewall 100 when a device 30a, which is inside the firewall 100, requests information from the device 14a, wherein the device 14a transmits the digital baton to a third party device 70a so that device 70a may directly send messages using the digital baton to the device 30a. The devices 14a and 30a may establish a session and trust with the firewall 100, and each other, using any of the above described methods, step 500. The firewall 100 adds to a message from the device 30a the digital baton that identifies that the returning messages contain the digital baton, which are part of the session and legitimate, and can be transmitted to the device 30a, step 502. At this point, the devices 30a and 14a may communicate freely as described above.

However, if the device 14a requests of a third party device 70a to supply information to the device 30a, the device 14a provides the digital baton to the third party device 70a, step 504. This may occur through a series of other third parties, wherein the device 14a requests the information from a device 14b, which requests the information from a device 70b, and such, until the device 70a is the final provider of the requested information. Thus, the digital baton is passed to each third party device so that the last device in the chain 70a providing the information uses the digital baton to provide the information directly to the device 30a.

When the firewall 100 receives a message providing information from the last third party device 70a in the chain, step 506. If the message is directed toward the device 30a, the digital baton security sub-system 120 looks up the digital baton in the database in the storage device 122, step 508, and if the digital baton is legitimate, the firewall passes the message to the device 30a, step 510.

As stated above, the digital baton may comprise an alphanumeric code. In accordance with another aspect of a preferred embodiment, the digital baton is a sequence of numbers that is unique to the session that a device protected by the firewall (e.g. 30a) and a device outside the firewall (e.g. 14a) establish. The sequence of numbers can be generated a number of ways, depending on the specific implementation. For example, according to one embodiment, the baton security sub-system 120 may create a nonce digital baton that is assigned to each packet that the firewall 100 recognizes. A new nonce digital baton may be generated for each packet.

In another embodiment, the sequence of numbers can be generated as a random number to indicate a session. The random number is sufficiently large so that the chance of re-generating the same value is negligible. In the above described database in the storage area 122, lifetimes are assigned to each session record to indicate the maximum length of a session before it is terminated by the firewall 100, or a length of time before an inactive session is terminated.

In another embodiment, the sequence of numbers monotonically increase with each new session. The firewall 100 maintains the list of currently legitimate baton numbers as described above with respect to storage area 122. The numbers may repeat or wrap once a maximum is reached. The numbers may be controlled by a floating window as used in TCP/IP protocol. The window moves with time and only numbers within the window are considered valid.

Finally, in another embodiment, the digital batons may be encrypted for security reasons using, for example, the RSA algorithm. Only the firewall is able to decrypt the encrypted batons, such that electronic devices 14a, 14b, 70a, 70b outside the firewall 100 are not aware of the actual values of the digital batons. The encrypted batons are merely passed from one electronic device to the next as needed to provide the information to the appropriate electronic device 30a, 30b, 40a, 40b inside the firewall 100. When the firewall 100 receives a message containing the digital baton, it is decrypted to recover the value, and the message is authenticated using in the database of the storage area 122. Alternatively, the DSA algorithm may be used, wherein only the hash values of the digital batons are stored in the storage area 122 for authentication when a message is received.

It will be apparent from the foregoing that, while preferred and exemplary embodiments have been illustrated and described, various modifications can be made without departing from the spirit and scope of the invention. Accordingly, it is not intended that the invention be limited by the detailed description of the preferred and exemplary embodiments.

The invention claimed is:

1. A system comprising:
   a firewall;
   a processor;
   a digital baton generator configured to, with the processor, generate a digital baton and provide the digital baton to a computing device, wherein the digital baton confers a trusted identity on any message containing the digital baton regardless of an identity of a sender of the message; and
   a security sub-system in the firewall configured to filter a received message sent to a device protected by the firewall based at least in part on whether the digital baton is in the received message and on whether an address of the device protected by the firewall to which the message is sent has a valid open session associated with the digital baton.

2. The system of claim 1, wherein the digital baton generator is included in the security sub-system in the firewall.

3. The system of claim 1, wherein the digital baton generator is separate from the firewall.

4. The system of claim 1, wherein the digital baton comprises an alphanumeric indicator.

5. The system of claim 1, wherein the digital baton is used throughout a communication session between an electronic device A, which is protected by the firewall, and an electronic device B, which is outside the protection of the firewall.

6. The system of claim 5, wherein the device A initiates the communication with the device B.

7. The system of claim 5, wherein the device B initiates the communication with the device A.

8. The system of claim 5, wherein the digital baton is created after an initiation of the communication between the device A and the device B.

9. The system of claim 5, wherein the device B provides the digital baton to a third party electronic device R to allow the device R to directly communicate with the device A using the digital baton to send one or more messages through the security sub-system.

10. A method comprising:
generating a digital baton;
providing the digital baton to a computing device, wherein the digital baton confers a trusted identity on any message containing the digital baton regardless of an identity of a sender of the message;
receiving a message sent to a device protected by a firewall; and
filtering the received message based at least in part on whether the digital baton is in the received message and on whether an address of the device protected by the firewall to which the message is sent has a valid open session associated with the digital baton.

11. The method of claim 10, wherein generating a digital baton is performed by a digital baton generator included in a security sub-system in the firewall.

12. The method of claim 10, wherein generating a digital baton is performed by a digital baton generator that is separate from the firewall.

13. The method of claim 10, wherein the digital baton comprises an alphanumeric indicator.

14. The method of claim 10, comprising using the digital baton throughout a communication session between an electronic device A, which is protected by the firewall, and an electronic device B, which is outside the protection of the firewall.

15. The method of claim 14, wherein the device A initiates the communication with the device B.

16. The method of claim 14, wherein the device B initiates the communication with the device A.

17. The method of claim 14, wherein generating the digital baton comprises generating the digital baton after an initiation of the communication between the device A and the device B.

18. The method of claim 14, wherein the device B provides the digital baton to a third party electronic device R to allow the device R to directly communicate with the device A using the digital baton to send one or more messages through the firewall.

19. A firewall comprising:
a processor;
a digital baton generator configured to, with the processor, generate a digital baton and provide the digital baton to a computing device, wherein the digital baton confers a trusted identity on any message containing the digital baton regardless of an identity of a sender of the message; and
a security sub-system configured to filter a received message sent to a device protected by the firewall based at least in part on whether the digital baton is in the received message and on whether an address of the device protected by the firewall to which the message is sent has a valid open session associated with the digital baton.

20. The firewall of claim 19, wherein the digital baton comprises an alphanumeric indicator.

21. The firewall of claim 19, wherein the digital baton is used throughout a communication session between an electronic device A, which is protected by the firewall, and an electronic device B, which is outside the protection of the firewall.

22. The firewall of claim 21, wherein the device A initiates the communication with the device B.

23. The firewall of claim 21, wherein the device B initiates the communication with the device A.

24. The firewall of claim 21, wherein the digital baton is created after an initiation of the communication between the device A and the device B.

25. The firewall of claim 21, wherein the device B provides the digital baton to a third party electronic device R to allow the device R to directly communicate with the device A using the digital baton to send one or more messages through the security sub-system.

26. An apparatus, comprising:
a processor;
a digital baton generator configured to, with the processor, generate a digital baton and provide the digital baton to a computing device protected by a security sub-system, wherein the digital baton confers a trusted identity on any message containing the digital baton regardless of an identity of a sender of the message; and
wherein the digital baton is configured to permit the security sub-system to filter a received message sent to a device protected by the security sub-system based at least in part on whether the digital baton is in the received message and on whether an address of the device protected by the firewall to which the message is sent has a valid open session associated with the digital baton.

27. An apparatus, comprising:
a network connection configured to connect to a security sub-system having a digital baton generator configured to generate a digital baton and provide the digital baton to a computing device, wherein the digital baton confers a trusted identity on any message containing the digital baton regardless of an identity of a sender of the message; and
wherein the security sub-system is configured to filter a received message sent to a device protected by the firewall based at least in part on whether the digital baton is in the received message and on whether an address of the device protected by the firewall to which the message is sent has a valid open session associated with the digital baton.

28. A set of software programs stored on one or more computer readable media, the software programs being executable on one or more computers to support a method for authenticating messages, the set of software programs comprising:
a software program for generating a digital baton;
a software program for providing the digital baton to a computing device, wherein the digital baton confers a trusted identity on any message containing the digital baton regardless of an identity of a sender of the message; and
a software program for filtering a received message sent to a device protected by a firewall based at least in part on whether the digital baton is in the received message and on whether an address of the device protected by the firewall to which the message is sent has a valid open session associated with the digital baton.

29. A computer readable medium storing program code which, when executed on a computer, cause the computer to perform a method comprising:
generating a digital baton;
providing the digital baton to a computing device, wherein the digital baton confers a trusted identity on any message containing the digital baton regardless of an identity of a sender of the message; and
filtering a received message sent to a device protected by a firewall based at least in part on whether the digital baton is in the received message and on whether an address of the device protected by the firewall to which the message is sent has a valid open session associated with the digital baton.

30. The computer readable medium of claim 29, wherein the program code performs generating a digital baton by generating a digital baton using a digital baton generator included in a security sub-system in the firewall.

31. The computer readable medium of claim 29, wherein the program code performs generating a digital baton by generating a digital baton using a digital baton generator that is separate from the firewall.

32. The computer readable medium of claim 29, wherein the digital code comprises an alphanumeric indicator.

33. The computer readable medium of claim 29, wherein the program code further performs using the digital baton throughout a communication session between an electronic device A, which is protected by the firewall, and an electronic device B, which is outside the protection of the firewall.

34. The computer readable medium of claim 33, wherein the device A initiates the communication with the device B.

35. The computer readable medium of claim 33, wherein the device B initiates the communication with the device A.

36. The computer readable medium of claim 33, wherein the digital baton is generated after an initiation of the communication between the device A and the device B.

37. The computer readable medium of claim 33, wherein the device B provides the digital baton to a third party electronic device R to allow the device R to directly communicate with the device A using the digital baton to send one or more messages through the firewall.

* * * * *